(12) United States Patent
Sheaffer et al.

(10) Patent No.: US 7,655,868 B2
(45) Date of Patent: Feb. 2, 2010

(54) STATOR BAR COMPONENTS WITH HIGH THERMAL CONDUCTIVITY

(75) Inventors: Jeffrey David Sheaffer, Glenville, NY (US); Elena Rozier, Schenectady, NY (US); David John Wardell, Ballston Spa, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/970,538

(22) Filed: Jan. 8, 2008

(65) Prior Publication Data

US 2009/0174278 A1 Jul. 9, 2009

(51) Int. Cl.
*H01B 7/00* (2006.01)

(52) U.S. Cl. .................................. 174/120 R; 310/45
(58) Field of Classification Search ............. 174/120 R, 174/137 R, 124 G; 310/45, 196, 201
See application file for complete search history.

(56) References Cited

U.S. PATENT DOCUMENTS

| | | | |
|---|---|---|---|
| 4,806,806 A | 2/1989 | Hjortsberg et al. | |
| 6,069,430 A | 5/2000 | Tsunoda et al. | |
| 6,242,825 B1* | 6/2001 | Mori et al. ..................... | 310/45 |
| 6,288,341 B1 | 9/2001 | Tsunoda et al. | |
| 6,359,232 B1* | 3/2002 | Markovitz et al. .......... | 174/209 |
| 6,504,102 B2 | 1/2003 | Tsunoda et al. | |
| 6,663,816 B2 | 12/2003 | Younsi et al. | |
| 6,746,758 B2 | 6/2004 | Tsunoda et al. | |
| 6,768,240 B2 | 7/2004 | Younsi et al. | |
| 7,120,993 B2 | 10/2006 | Yamamoto et al. | |
| 2004/0094325 A1* | 5/2004 | Yoshida et al. .......... | 174/120 R |
| 2004/0119364 A1 | 6/2004 | Thiot et al. | |
| 2005/0245644 A1 | 11/2005 | Smith et al. | |
| 2006/0258791 A1* | 11/2006 | Okamoto et al. ............ | 524/449 |
| 2007/0117911 A1 | 5/2007 | Irwin et al. | |

FOREIGN PATENT DOCUMENTS

| | | |
|---|---|---|
| EP | 0266602 A1 | 10/1987 |
| GB | 2277205 | 10/1994 |
| JP | 59058802 | 4/1984 |
| JP | 9308160 | 11/1997 |
| JP | 10028345 | 1/1998 |
| JP | 10201156 | 7/1998 |

OTHER PUBLICATIONS

M. Tari, et al.; "A Highi Voltage Insulating System with Increased Thermal Conductivity for Turbo Generators"; Proceedings: Electrical Insulation Conference and Electrical Manufacturing & Coil Winding Technology Conference, Sep. 23-25, 2003, pp. 613-617.

M. Tari, et al.; "HTC Insulation Technology Drives Rapid Progress of Indirect-Cooled Turbo Generator Unit Capacity"; 2001 Power Engineering Society Summer Meeting, Conf. Proceedings, vol. 3, Jul. 15-19, 2001; pp. 1427-1432.

S. Nagano, et al.; "Development of World's Largest Hydrogen-Cooled Turbine Generator"; 2002 IEEE Power Engineering Society Summer Meeting, Conf. Proceedings, vol. 2, Track 3; pp. 657-663.

\* cited by examiner

*Primary Examiner*—Chau N Nguyen
(74) *Attorney, Agent, or Firm*—Sutherland Asbill & Brennan, LLP

(57) ABSTRACT

A stator bar. The stator bar may include a number of conductors and an insulation layer positioned about the conductors. The insulation layer includes a ceramic component.

15 Claims, 4 Drawing Sheets

STATOR BAR COMPONENTS WITH HIGH THERMAL CONDUCTIVITY

TECHNICAL FIELD

The present application relates generally to insulating systems for electrical machines and more particularly relates to improving the thermal conductivity of insulation used with stator bar components through the addition of high thermal conductivity fibers or whiskers such as ceramics, including non-traditional non-metallic materials.

BACKGROUND OF THE INVENTION

Insulation materials for electrical machines such as generators, motors, and transformers generally include a glass cloth and/or a combination of a glass cloth, a resin binder, a mica tape, and similar materials. Such insulating materials generally need to have the mechanical and the physical properties that can withstand the various electrical rigors of the electrical machines while providing adequate insulation. In addition, the insulation materials should withstand extreme operating temperature variations and provide a long design life.

In recent years, the thermal conductivity of general insulation has improved from about 0.3 W/mK to about 0.5 W/mK (Watts per meter per degrees Kelvin) via the addition of high thermal conductivity fillers. Specifically with respect to stator bars, however, E-glass (electrical fiberglass) generally is used to insulate the conductors, as a vertical separator, and as a backer in insulating tapes. Such E-Glass may have a thermal conductivity of about 0.99 W/mK. Similarly, a Dacron glass (Daglass) also may be used. Daglass may have a thermal conductivity of about 0.4 W/mK.

By reducing the thermal resistance of the stator bar components, improved heat transfer may be obtained between the stator bar conductors and the stator core. Specifically, the current density of the copper conductor may be increased by effectively cooling the conductors. There is thus a desire for even further thermal conductivity improvements so as to produce more power from a smaller unit at a more economical cost or at a higher efficiency from an existing unit.

SUMMARY OF THE INVENTION

The present application thus describes a stator bar or similar type of armature coil. The stator bar may include a number of conductors and an insulation layer positioned about the conductors. The insulation layer may include a ceramic component.

The present application also describes a stator bar with two or more conductor tiers and a vertical separator between each of the tiers. The vertical separator may include a ceramic component.

The present application further describes a stator bar with two or more conductor tiers and a layer of ground insulation surrounding the tiers. The layer of ground insulation may include a ceramic component.

These and other features of the present application will become apparent to one of ordinary skill in the art upon the review of the following detailed description when taken in conjunction with the several drawings and the following claims.

DETAILED DESCRIPTION

Figure 1:
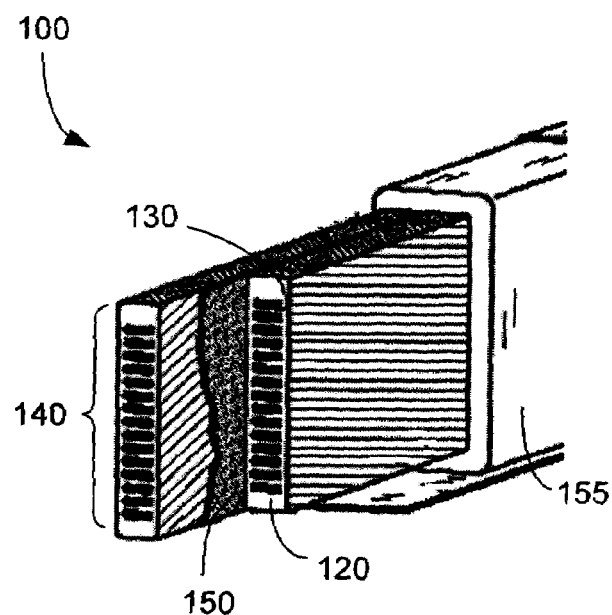
FIG. 1 is a perspective view of a stator bar as is described herein.

Referring now to the drawings, in which like numerals refer to like elements throughout the several views, FIG. 1 shows a stator bar 100 as is described herein. As described above, the stator bar 100 may be used with electrical machines as is known in the art. An electrical machine generally has multiple stator bars 100. The multiple stator bars 100 may be identical and may be disposed upon or about each other.

Generally described, each stator bar 100 may include a number of conductors 120. The conductors 120 may be made out of copper, copper alloys, aluminum, or similar materials. A layer of conductor insulation 130 may separate individual conductors 120. In this example, the conductor insulation 130 may include a typical E-Glass, Daglass, or a similar type of glass material. The E-Glass may be a low alkali borosilicate fiberglass with good electro-mechanical properties and with good chemical resistance. E-Glass, or electrical grade glass, has excellent fiber forming capabilities and is used as the reinforcing phase in fiberglass. The E-Glass may have a thermal conductivity of about 0.99 W/mK. The Daglass may be a yarn with a mixture of polyester and glass fibers. The Daglass may have a thermal conductivity of about 0.4 W/mK. A glass cloth made from the E-Glass, the Daglass, or from similar types of materials may have any desired woven densities, weights, thicknesses, strengths, and other properties.

In the embodiment as shown, the stator bar 100 includes two tiers 140 of the conductors 120. Any number of tiers 140 may be used. The tiers 140 may be separated by a vertical separator 150. Typical vertical separators 150 may include paper, felt, or a glass fabric that is treated with a partially cured resin that, when cured, flows and bonds the tiers 140 together. The separators 150 also provide added electrical insulation between tiers 140.

The tiers 140 also may be surrounded by a layer of ground insulation 155. As described above, the ground insulation 155 commonly may be constructed of mica paper, a glass cloth or unidirectional glass fibers, and a resin binder. The ground insulation 155 generally is in the form of a resin rich tape.

Figure 2:
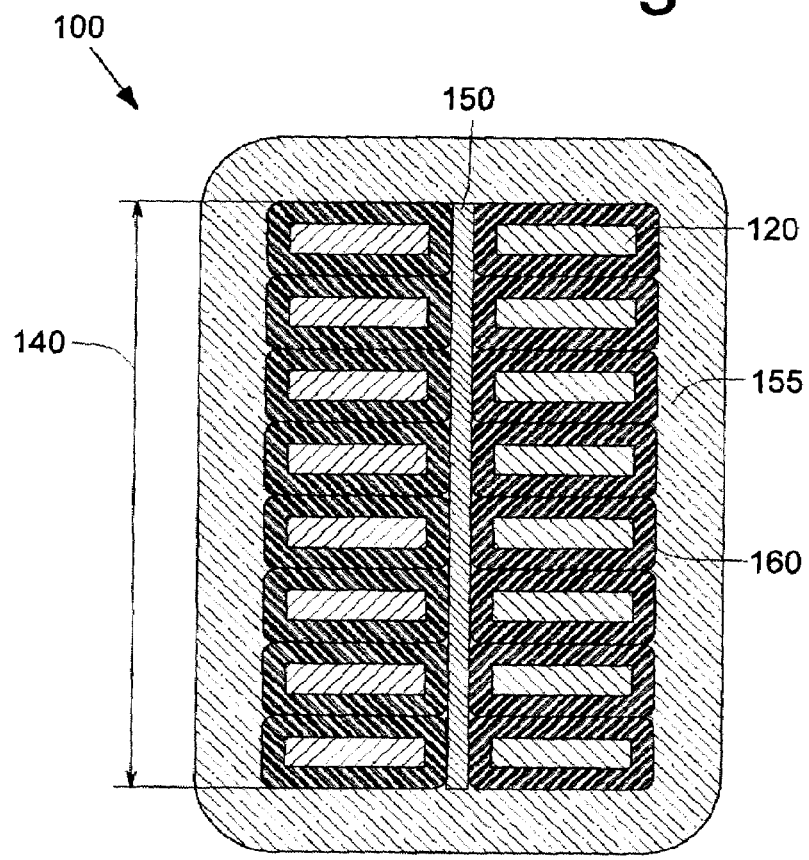
FIG. 2 is a side cross-sectional view of a stator bar as is described herein.
Figure 6:
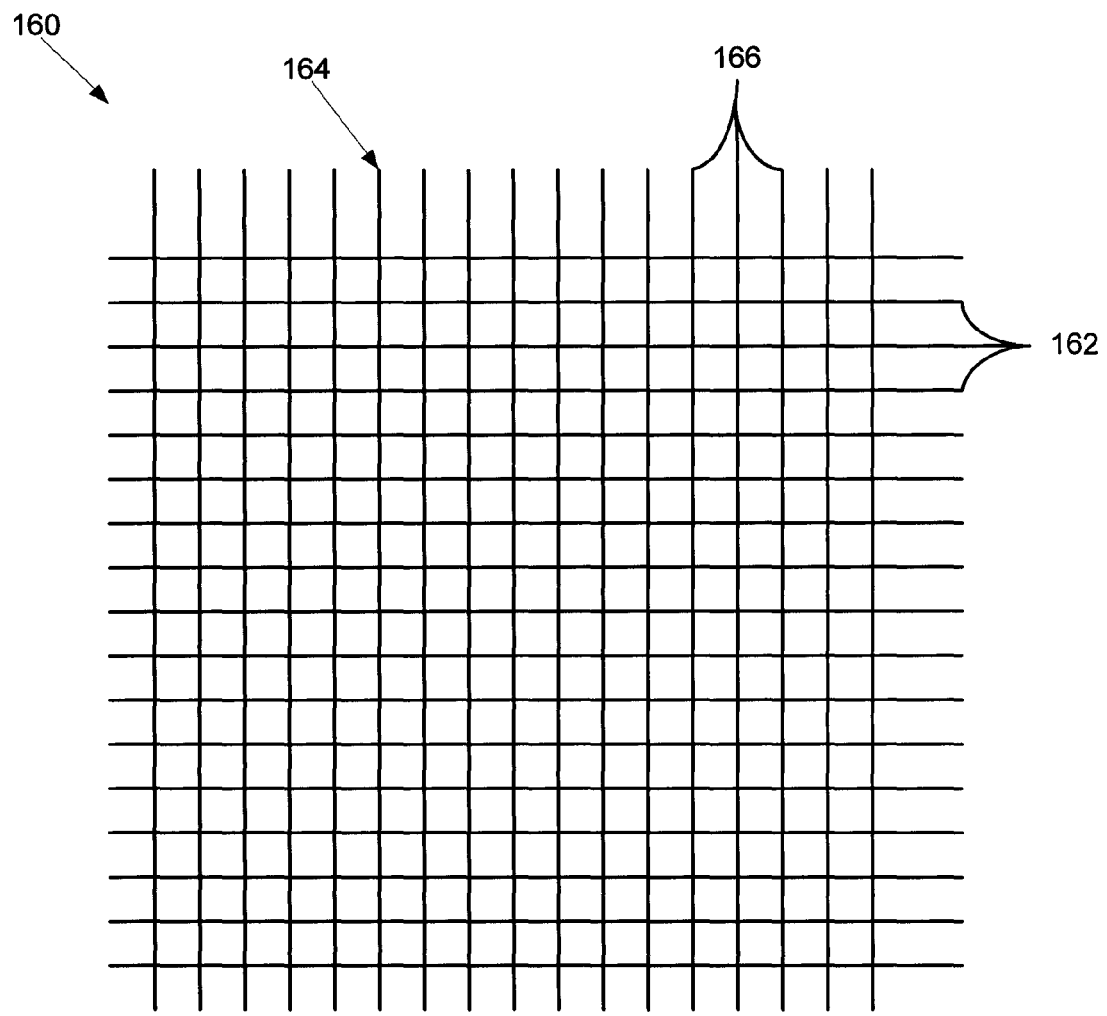
FIG. 6 is a perspective view of an insulating tape as is described herein

FIG. 2 shows a stator bar 100 with an improved conductor insulator 160. The conductor insulator 160 includes the B-Glass or the Daglass of the conductor insulation 130 with the addition of ceramic component of fibers or whiskers 162, as shown in FIG. 6. For example, aluminum oxide fibers or whiskers may have a thermal conductivity of about 20 W/mK. The improved conductor insulator 160 thus may incorporate such ceramic fibers or whiskers 162 into a weave 164 of the glass cloth or incorporate it into glass yarns 166 so as to improve the thermal conductivity of the material to much higher than that of pure glass. The resultant fabric also could have the ceramic fibers or whiskers 162 in one direction with the Daglass 166 or other material in the other. Alternatively, the improved conductor insulator 160 may be a pure aluminum oxide cloth or a cloth of a similar ceramic material.

In this example, the ceramic fibers, whiskers, or other forms may include boron nitride (BN), aluminum nitride (AlN), silicon nitride (Si3N4), aluminum oxide (Al2O3), magnesium oxide (MgO), zinc oxide (ZnO), strontium titanate (SrTiO3), titanium dioxide (TiO2), silica (SiO2), diamond (C), and similar types of materials.

By wrapping the improved conductor insulator 160 around the conductors 120, the thermal conductivity may increase. For example, certain conductors 120 may be closer to the source of the magnetic field and hence may be subject to higher magnetic fields. Such higher magnetic fields may induce higher currents so as to set up a temperature differential between the closer and the farther conductors 120 within the stator bar 100. Use of the improved conductor insulator 160 described herein may allow for improved heat flow and a lower temperature difference between the respective conductors 120. Likewise, certain stator bars 100 may use hollow conductors to serve as passages for fluid flow therethrough so as to remove heat from the stator bar 100 as a whole. In such designs, the use of the improved conductor insulator 160 should allow more efficient cooling and a higher ratio of solid to hollow conductors 120. As a result, the amount of copper in the conductors 120 may increase in a stator bar 100 of the same size.

Figure 3:
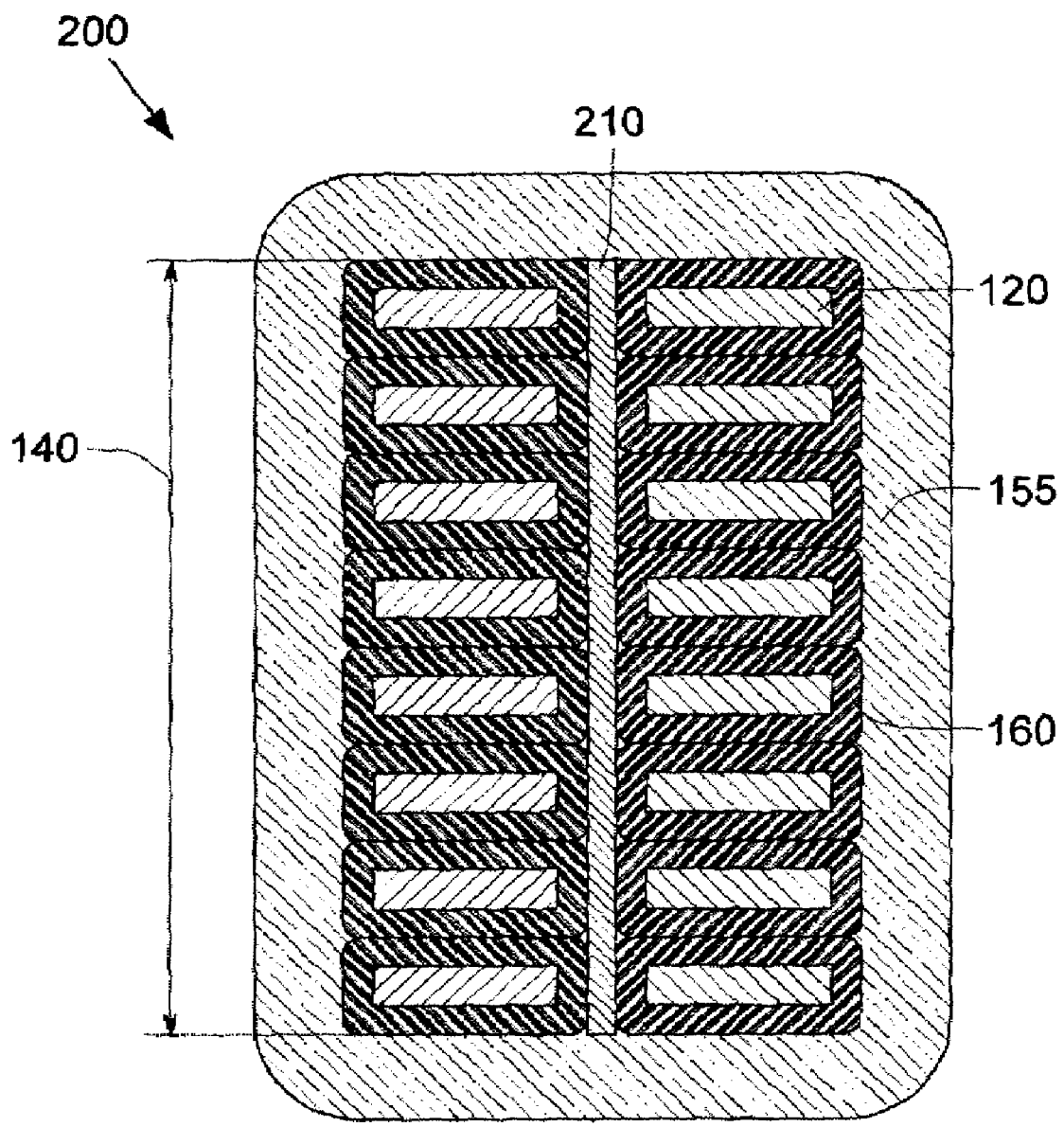
FIG. 3 is a side cross-sectional view of a stator bar as is described herein.

FIG. 3 shows a further embodiment of a stator bar 200. The stator bar 200 may be similar to that described above but with an improved vertical separator 210. As above, the improved vertical separator 210 may be a mixture of paper, felt, or the glass fabric along with the ceramic fibers or whiskers so as to provide improved heat transfer between the tiers 140. As described above, the fibers or whiskers may include boron nitride (BN), aluminum nitride (AlN), silicon nitride (Si3N4), aluminum oxide (Al2O3), magnesium oxide (MgO), zinc oxide (ZnO), strontium titanate (SrTiO3), titanium dioxide (TiO2), silica (SiO2), diamond (C), and similar types of materials.

Figure 4:
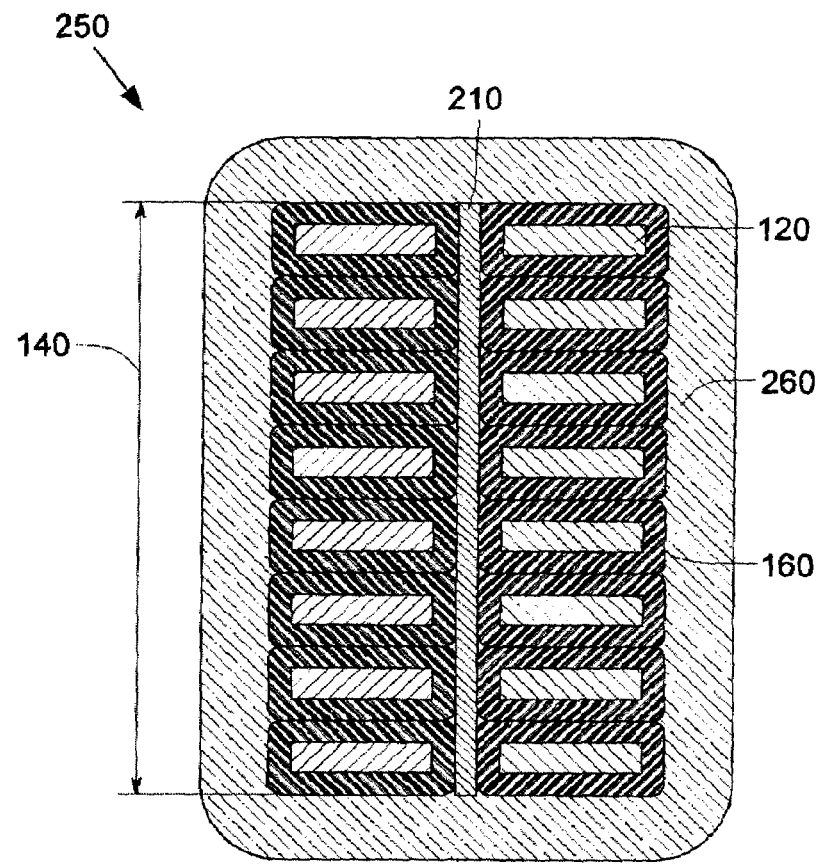
FIG. 4 is a side cross-sectional view of a stator bar as is described herein.
Figure 5:
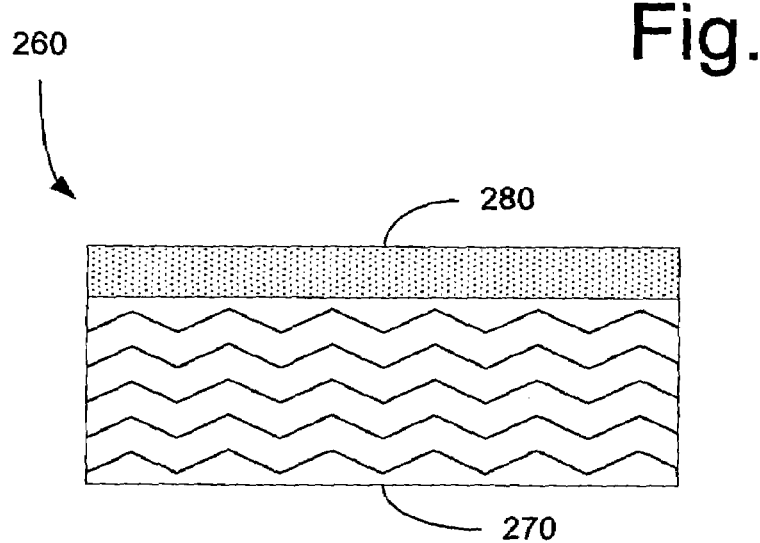
FIG. 5 is a side cross-sectional view of an insulating tape as is described herein.

FIGS. 4 and 5 show a further embodiment of a stator bar 250. As described above, the ground insulation 155 of the stator bar 100 may be commonly constructed of mica paper, glass, and a resin binder. This insulation is generally in the form of a resin rich tape. In this case, the stator bar 250 has an improved ground insulation 260. The improved ground insulation 260 may include the ground insulation 155 described above with the addition of the ceramic fibers or whiskers. Specifically, the improved ground insulation 260 has a mica/binder layer 270 and a ceramic backer 280 on one or both sides of the mica/binder layer 270. In this case, the conventional E-glass or Daglass backer may be replaced or mixed with the ceramic material so as to provide higher thermal conductivity.

It should be apparent that the foregoing relates only to the preferred embodiments of the present application and that numerous changes and modifications may be made herein by one of ordinary skill in the art without departing from the general spirit and scope of the invention as defined by the following claims and equivalents thereof.

We claim:

1. A stator bar, comprising:
    a plurality of conductors; and
    a fabric insulation layer positioned about the plurality of conductors;
    wherein the insulation layer comprises a weave of glass fibers and ceramic fibers.

2. The stator bar of claim 1, wherein the fabric insulation layer comprises a thermal conductivity of more than about 0.99 W/mK.

3. The stator bar of claim 1, wherein the ceramic fibers comprises boron nitride (BN), aluminum nitride (AlN), silicon nitride (Si3N4), aluminum oxide (Al2O3), magnesium oxide (MgO), zinc oxide (ZnO), strontium titanate (SrTiO3), titanium dioxide (TiO2), silica (SiO2), or diamond (C).

4. The stator bar of claim 1, wherein the fabric insulation layer comprises said glass fibers in a first direction and said ceramic fibers in a second direction.

5. The stator bar of claim 1, wherein the plurality of conductors comprises two or more tiers of conductors and wherein the fabric insulation layer comprises a vertical separator between each of the tiers.

6. The stator bar of claim 1, wherein the fabric insulation layer comprises a layer of ground insulation surrounding a plurality of tiers.

7. The stator bar of claim 6, wherein the layer of ground insulation comprises a tape.

8. The stator bar of claim 6, wherein the layer of fabric insulation comprises a mica/binder layer and a backer to the mica/binder layer.

9. A stator bar, comprising:
    two or more conductor tiers; and
    a fabric vertical separator between each of the tiers;
    wherein the vertical separator comprises a weave of glass fibers and ceramic fibers.

10. The stator bar of claim 9, wherein the fabric vertical separator comprises a thermal conductivity of more than about 0.99 W/mK.

11. The stator bar of claim 9, wherein the ceramic fibers comprise boron nitride (BN), aluminum nitride (AlN), silicon nitride (Si3N4), aluminum oxide (Al2O3), magnesium oxide (MgO), zinc oxide (ZnO), strontium titanate (SrTiO3), titanium dioxide (TiO2), silica (SiO2), or diamond (C).

12. A stator bar, comprising:
    two or more conductor tiers; and
    a layer of fabric ground insulation surrounding the tiers;
    wherein the layer of fabric ground insulation comprises a weave of glass fibers and ceramic fibers.

13. The stator bar of claim 12, wherein the layer of fabric ground insulation comprises a thermal conductivity of more than about 0.99 W/mK.

14. The stator bar of claim 12, wherein the ceramic fibers comprise boron nitride (BN), aluminum nitride (AlN), silicon nitride (Si3N4), aluminum oxide (Al2O3), magnesium oxide (MgO), zinc oxide (ZnO), strontium titanate (SrTiO3), titanium dioxide (TiO2), silica (SiO2), or diamond (C).

15. The stator bar of claim 12, wherein the layer of fabric ground insulation comprises a mica/binder layer and a backer or backers to the mica/binder layer.

* * * * *